Figure 1:
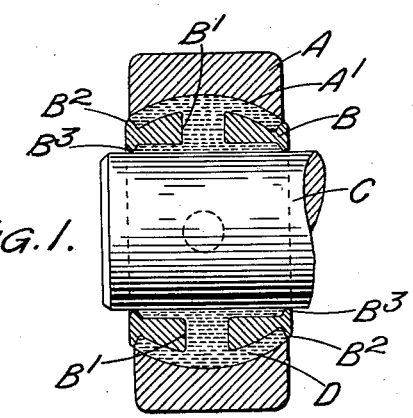

March 7, 1933.  H. R. RICARDO  1,900,617

SELF ALIGNING SPHERICAL JOINT OR BEARING

Filed Feb. 20, 1930

Inventor,
Harry Ralph Ricardo
Per
Watson, Cort, Mone & Grindle Atty.

Patented Mar. 7, 1933

1,900,617

UNITED STATES PATENT OFFICE

HARRY RALPH RICARDO, OF LONDON, ENGLAND

SELF-ALIGNING SPHERICAL JOINT OR BEARING

Application filed February 20, 1930, Serial No. 430,098, and in Great Britain March 18, 1929.

This invention relates to spherical joints or bearings of the type comprising an outer one-piece member having a part spherical inner bearing surface and a pin, both formed of a normal metal fusible at a relatively high temperature, and an intermediate ball member interposed between the outer member and the pin, this intermediate member being movable either relatively to the outer member only or relatively to the outer member and the pin and having its spherical outer bearing surface or both this outer bearing surface and an inner cylindrical bearing surface for the pin formed of metal fusible at a relatively low temperature. The present invention relates to that particular form of such spherical joints or bearings in which the intermediate ball member comprises an annular body or skeleton formed of metal fusible at a relatively high temperature having cast on either its outer surface only or on both its inner and outer surfaces metal fusible at a relatively low temperature which thus constitutes the outer bearing surface or both the outer and the inner bearing surfaces of the intermediate member.

Such spherical joints or bearings as previously made operate satisfactorily under moderate loads but under heavier loads it has been found that the relatively soft fusible metal on the skeleton tends to be squeezed out in the axial direction through the ends of the space in which this metal lies so that play develops between the parts of the joint or bearing.

According to the present invention the annular skeleton of the intermediate member of a spherical joint or bearing of the kind referred to is provided with flanges or shrouds formed integral with or rigidly connected to its ends and extending radially outwards so as to close in partially or wholly the ends of the annular space between the skeleton and the outer member in which the fusible metal lies, and thus prevent this metal being forced in the axial direction out of such space when under load. In order to permit the entry of the skeleton into the outer member prior to the casting of the fusible metal around such skeleton, it is generally necessary to cut away diametrically opposite parts of each shroud, but this has been found not to affect appreciably the desired action of the shrouds.

Where the skeleton is adapted to slide on the pin, for example when the spherical joint forms an operative driving connection between a crank pin and a sleeve valve to which a combined oscillating and reciprocating motion is imparted thereby, the inner cylindrical surface of the skeleton as well as its outer surface is conveniently provided with a fusible metal bearing surface and in such a construction inwardly extending annular shrouds or flanges may be formed at the ends of the skeleton in addition to the outwardly extending shrouds or flanges, so as also to close in partially or wholly the ends of the space between the skeleton and the pin in which lies the fusible metal constituting the bearing surface for the pin.

In either case the edges of the inner and outer shrouds may lie either flush with the bearing surfaces of the adjacent fusible metal or slightly below such bearing surfaces so as not to be in contact with the adjacent part of the outer member or pin.

Figure 2:
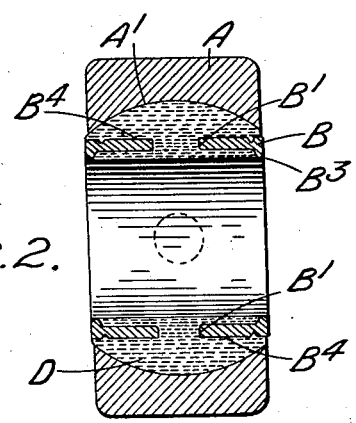
Figure 3:
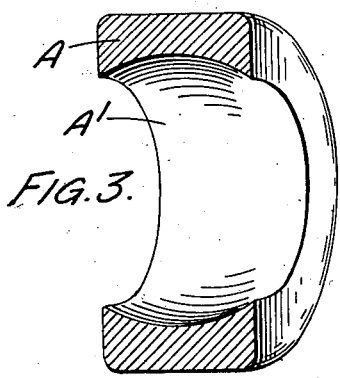
Figure 4:
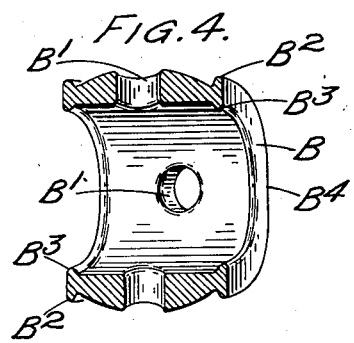

The invention may be carried into practice in various ways but one construction of spherical joint according to this invention as may be used to connect a crank pin to a sleeve valve to which it imparts a combined oscillating and reciprocating motion, is illustrated by way of example in the accompanying drawing, in which Figure 1 is a sectional side elevation of one construction of spherical joint according to this invention, Figure 2 is a sectional plan of the arrangement shown in Figure 1, Figure 3 is a sectional perspective view of the outer member of the joint, and Figure 4 is a similar view to Figure 3 of the skeleton of the intermediate member of the joint.

In the construction illustrated the spherical joint comprises an outer annular one-piece member A constructed of a metal fusible at a relatively high temperature, this member, which may be adapted to be rigidly mounted within a socket formed in the lower end of the sleeve valve, having an inner concave part-spherical bearing surface $A^1$. Disposed within this outer member A is an intermediate ball member comprising an annular skeleton B formed of a metal fusible at a relatively high temperature, within the bore of which is adapted to lie the crank pin C whereby movement is imparted to the spherical joint. The skeleton B is, as shown, in the form of a ring conveniently having a series of radial holes $B^1$ passing through it and inner and outer radial flanges or ribs $B^2$, $B^3$ at its ends extending to points respectively adjacent to the inner part-spherical bearing surface of the outer member A and the outer surface of the pin C. Cast around the exterior and interior of the skeleton B into the spaces between the flanges $B^2$, $B^2$ and $B^3$, $B^3$ so as to form bearing surfaces on the intermediate member B for the pin C and outer member A, is a fusible metal D such as white metal as used in ordinary bearings. This white metal is cast around the skeleton B while it is in position within the outer member A and in order to permit the insertion of the skeleton into the outer member prior to the casting operation, diametrically opposite parts of the skeleton B are cut away as indicated at $B^4$ in Figures 2 and 4.

For the casting operation a pin is employed as a core to form the inner bearing surface or bore of the intermediate member which is preferably slightly larger in diameter than the crank pin C which is to engage this bore in practice so that, when the pin employed as a core for the casting operation is withdrawn after this operation is completed, the bore of the intermediate member is of such a diameter as to provide the necessary working clearance between the crank pin C and the intermediate member. The normal shrinkage of the fusible metal D on cooling will on the other hand provide the necessary working clearance between the outer spherical bearing surface of the intermediate member and the outer member A.

As will be seen, the casting of the fusible metal D in position upon and within the skeleton B is facilitated by the radial holes $B^1$ passing through this skeleton which permit the fusible metal to flow from the outside to the inside of the skeleton, thus reducing the risk of gaps being left in either of the bearing surfaces due to the fusible metal not completely filling the desired spaces. At the same time the passing of the fusible metal D through the holes $B^1$ serves to lock this metal firmly to the skeleton B.

It will be seen that with an arrangement according to the present invention the flanges $B^2$, $B^3$ serve to dam the spaces at the ends of the joint or bearing through which the fusible metal might be forced by excessive loads, and thus prevents the squeezing out of the fusible metal axially through these spaces.

It is to be understood that although the invention has been described with particular reference to a self-aligning spherical joint for use in the operating mechanism for a sleeve valve having a combined oscillating and reciprocating motion, it may be applied to spherical joints or bearings of the kind referred to for other purposes without departing from this invention.

What I claim as my invention and desire to secure by Letters Patent is:—

1. A spherical joint or bearing including in combination an outer one-piece member and a pin, both of which are formed of metal fusible at a relatively high temperature, and an intermediate member comprising an annular skeleton formed of a metal fusible at a relatively high temperature having cast thereon metal fusible at a relatively low temperature, and flanges on the ends of the skeleton extending radially so as to close in at least partially the ends of the space between the skeleton and the outer member in which the fusible metal lies and thus prevent this metal being forced in the axial direction out of such space when under load, diametrically opposite parts of each flange being cut away to permit the entry of the skeleton into the outer member prior to the casting of the fusible metal around the skeleton.

2. A spherical joint or bearing including in combination an outer one-piece member and a pin both of which are formed of normal metal fusible at a relatively high temperature and an intermediate member comprising an annular skeleton formed of a metal fusible at a relatively high temperature having cast thereon and within it metal fusible at a relatively low temperature, and flanges on the ends of the skeleton extending radially outwards and inwards so as to close in at least partially the ends of the spaces between the skeleton and the outer member on the one hand, and between the skeleton and the pin on the other hand, in which spaces the fusible metal lies thus preventing this metal being forced in the axial direction out of such spaces when under load.

3. For use in a spherical joint or bearing of the class described, an intermediate member consisting of an annular skeleton having flanges at its ends extending radially outwards and inwards, and having a fusible bearing metal cast thereon between the flanges.

4. A spherical joint or bearing including in combination an outer one-piece member and an inner member, both of which are formed of metal fusible at a relatively high temperature, and an intermediate member comprising an annular skeleton formed of a metal fusible at a relatively high temperature having thereon and united therewith metal fusible at a relatively low temperature, and integrally formed flanges on the ends of the skeleton extending radially so as to close in at least partially the ends of the space between the skeleton and the outer member in which the fusible metal lies and thus prevent this metal being forced in the axial direction out of such space when under load, diametrically opposite parts of each flange being cut away to permit the entry of the skeleton into the outer member prior to the union of the fusible metal with the skeleton.

5. In a joint or bearing, the combination with an inner member, of an outer member, a skeleton member interposed between said first named members, said skeleton member having cast thereon a bearing metal fusible at a relatively low temperature having bearing engagement with said inner and outer members, and flanges on the ends of said skeleton member extending radially inwardly and outwardly toward said first named members to enclose at least partially the space in which the bearing metal lies to prevent this metal being forced in the axial direction out of such space when under load.

In testimony whereof I have signed my name to this specification.

HARRY RALPH RICARDO.